Feb. 4, 1941.   G. SZASZ   2,230,341
BALANCING OR WEIGHING DEVICE
Filed Oct. 3, 1938
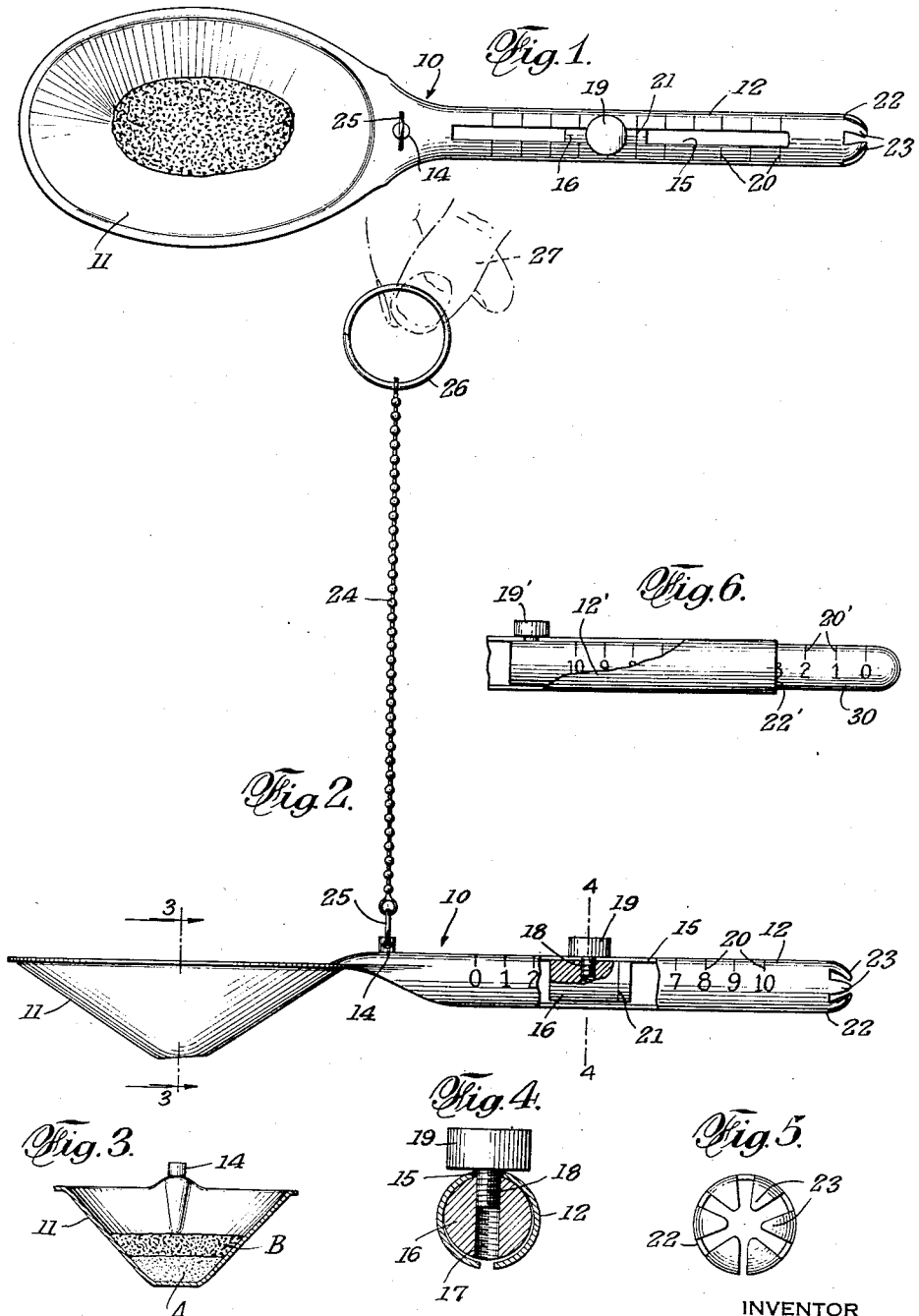
INVENTOR
GEZA SZASZ
BY
Maxwell E. Sparrow
ATTORNEY Patented Feb. 4, 1941

2,230,341

UNITED STATES PATENT OFFICE 2,230,341

BALANCING OR WEIGHING DEVICE

Geza Szasz, New York, N. Y.

Application October 3, 1938, Serial No. 232,968

2 Claims. (Cl. 265—49)

This invention relates generally to improvements in balancing or weighing apparatus and concerns a portable weighing device.

It is an object of the present invention to provide means in a unitary structure for readily receiving, weighing and proportioning substances in granular, powdered or liquid forms.

It is a further object of the present invention to provide in a single unit a cup-shaped member and an extension, the member being employed to receive and hold therein a substance to be weighed, the extension being utilized in cooperation with a slidable weight for facilitating weighing of the said substance.

Still a further object of the invention resides in the provision of a bowl or scoop member and a hollow arm forming a handle for said member, which arm carries a slidable weight for adjustment thereon for accurately proportioning by weight a plurality of substances with respect to each other.

Still another object of the present invention is to provide a combined substance receiving, proportioning and weighing device from a single blank which includes the receiving cup, the weighing arm and the balancing pivot or fulcrum.

Still another object of the invention is to provide means to pivotally support the device and to facilitate the balancing of said device when in operation.

A still further object of this invention consists in the provision of a spoon-like measuring and weighing device in which the weight is slidably arranged in relation to the handle, provision being made in the latter for accommodating the weight or a portion thereof; the invention further providing for graduations on said handle and preferably an indicator on said weight for cooperation with said graduations to more readily read the scale on said handle.

Yet a further object of this invention resides in the provision in such a device of a tubular handle for guidingly receiving the weight, the handle having a longitudinal slot through which projects a pin joining the said weight with a finger gripping element for adjustingly fixing the position of the weight with respect to the handle; the weight and the gripping element being guided along said slot to adjusted position.

Still another object of the present invention is to provide closure means at the free end of said tubular handle to prevent the weight from falling out of the handle, said closure means preferably being formed by serrating said free end and turning in the serrated sections.

This invention accordingly consists in the features of construction, combination of parts and in the unique relations of the members and in the relative proportioning and disposition thereof; all as more completely outlined herein.

To enable others skilled in the art so fully to comprehend the underlying features thereof that they may embody the same by the numerous modifications in structure and relation contemplated by this invention, a drawing depicting a certain form of the invention has been annexed as a part of this disclosure, and in such drawing, like characters of reference denote corresponding parts throughout all the views, of which:

Fig. 1 is a top plan view of the device embodying the invention.

Fig. 2 is a side elevational view of the device, shown in Fig. 1.

Fig. 3 is a sectional view along line 3—3 of Fig. 2.

Fig. 4 is a sectional view along line 4—4 of Fig. 2.

Fig. 5 is an end view of the handle proper.

Fig. 6 is a fragmentary view of a modified handle.

Referring now to the drawing the spoon-like body 10 substantially comprises the scoop member or bowl 11, the handle or extended portion 12, and the pivotal or fulcrum means 14. This body is preferably made from a single blank which is formed in such a manner as to provide the bowl 11, hollow handle 12 and the fulcrum proper 14.

The handle 12 thas a longitudinal slot 15. Within the hollow of the handle is located a weight portion 16 provided with a threaded opening 17 accommodating the threaded pin or shank 18 of the finger gripping element 19. Shank 18 rides in the slot 15. The weight portion 16, pin 18 and element 19 are moved along the handle to desired positions. When the balanced position is attained, as hereinafter explained, the element 19 is tightened against the walls of the handle 12 adjacent the slot 15.

Handle 12 is preferably provided with indicia or graduations 20 along its length and the weight portion 16 may have an indicator 21 to cooperate with the said graduations. The free end 22 of the handle may be serrated and the serrations 23 bent or turned in providing a closure and finished portion for the handle. Thus, in the event that the weight portion 16 accidentally unscrews from the element 19, the aforementioned closure will act as a stop preventing the falling out of the said weight portion.

Attached to fulcrum or stud 14 by means of a flat connecting ring 25 is a flexible member, such as, for example, a chain 24, at the free end of which may be provided a finger ring 26.

The device may be employed as follows: The material or substance to be weighed is scooped up by or may be poured into the bowl or scoop portion 11. In order to weigh the contents a finger 27 of the hand of the operator may be inserted within ring 26 and the entire device supported by and suspended from said finger. The element 19 is then moved along the slot 15 until a balance is obtained between the portions of the spoon-like body on either side of fulcrum or stud 14.

The graduations 20 may represent fractions of a weight unit such as ounces, grams, etc. or merely proportional parts.

The device may conveniently be used where it is desired to mix and weigh substances in definite proportions. For example, a substance A may be placed within bowl 11 in such amount that a balance is obtained, when the indicator 21 of weight portion 16 is at the point indicated by the graduation "2" (Fig. 2), thus providing 2 parts by weight of the substance A. Now, if it is desired, to mix substance A with, say, 3 parts by weight of a substance B, the weight portion 16 is moved by element 19 to graduation "5" and fixed there by turning the knob or element 19. A quantity of substance B is then added to substance A in the bowl 11 until a balance is obtained; this being made evident by observation in the usual manner.

It is understood that any suitable supporting means may be employed facilitating balancing of the device. It is further understood, that other balancing or weighing means may be used than that heretofore described, such as, for example, that disclosed in Fig. 6.

In Fig. 6, there is shown a portion or extension 30 arranged to telescopically slide within the hollow of handle 12'. Of course, in this case, the end closure 22 of the handle 12 of Fig. 2 is omitted. Portion 30 is provided with the indicia or graduations 20' and the free end 22' of the sleeved handle 12' is employed as the indicator. This extension 30 is a substitute for the weight portion 16 of Fig. 2, but may be moved in like manner as the latter by finger gripping element or head 19'. It can be thus readily seen that according to the invention there has been provided a balancing or weighing device which mainly comprises a spoon body provided with a scoop portion and a hollow handle made of a single sheet of material, said handle extending substantially in alignment with the top of said portion and being provided with a slot, a weight member located within said handle, an element outwardly projecting from said weight member and guided within said slot, a stud positioned in a plane above said body and substantially at a point where said handle extends from said portion, and flexible means having a finger grip at its free end attached to said stud and adapted to form a support for said body during weighing operation, said handle extending substantially horizontally when the weighing device is in balanced weighing position.

From the foregoing description, taken in connection with the accompanying drawing, the advantage of the construction and operation of the device shown will be readily understood by those skilled in the art to which the invention pertains; and while I have described the principle of operation, together with the device which I now consider to be the best embodiment thereof, I desire to have it understood that the device shown is merely illustrative and that such changes may be made as are within the scope of the appended claims.

Having thus described the invention what is claimed as new and desired to be secured by Letters Patent is:

1. A balancing or weighing device comprising a spoon body provided with a scoop portion and a hollow handle made of single sheet of material, said handle extending in alignment with the top of said portion and being provided with a slot, a weight member located within said handle, an element outwardly projecting from said weight member and guided within said slot, a stud positioned in a plane above said body and substantially at a point where said handle extends from said portion, and flexible means having a finger grip at its free end attached to said stud and adapted to form a support for said body during weighing operation, said handle extending substantially horizontally when the weighing device is in balanced weighing position.

2. A balancing or weighing device comprising a spoon body provided with a scoop portion and an open-ended handle forming a sleeve, said handle substantially alignedly extending from the top of said portion and being provided with a slot, a weight member having graduations located within said handle, an element outwardly projecting from said weight member and guided within said slot to adjust said weight member relatively to said handle, a stud projecting from and positioned at the point of conjunction between said scoop portion and said handle, and flexible means attached to said stud and adapted to form a support for said body during weighing operation whereby said weight may be adjusted at said handle and extended therebeyond to form weight indicating means between the free edge of said open end and said graduations on said weight member, said handle extending substantially horizontally when the weighing device is in balanced weighing position.

GEZA SZASZ.